(12) United States Patent
Amano et al.

(10) Patent No.: US 12,379,756 B2
(45) Date of Patent: Aug. 5, 2025

(54) MICROCONTROLLER WITH CAPACITORS CONNECTED IN SERIES TO SUPPRESS POWER FLUCTUATION

(71) Applicant: DENSO CORPORATION, Kariya (JP)

(72) Inventors: Haruki Amano, Kariya (JP); Hideki Kabune, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/807,955

(22) Filed: Jun. 21, 2022

(65) Prior Publication Data

US 2022/0317748 A1 Oct. 6, 2022

Related U.S. Application Data

(63) Continuation of application No. PCT/JP2020/046531, filed on Dec. 14, 2020.

(30) Foreign Application Priority Data

Dec. 26, 2019 (JP) ................. 2019-236619

(51) Int. Cl.
*G06F 1/26* (2006.01)
*H02K 11/33* (2016.01)
*H02P 25/22* (2006.01)
*B62D 5/04* (2006.01)

(52) U.S. Cl.
CPC .............. *G06F 1/26* (2013.01); *H02K 11/33* (2016.01); *H02P 25/22* (2013.01); *B62D 5/04* (2013.01)

(58) Field of Classification Search
None
See application file for complete search history.

(56) References Cited

U.S. PATENT DOCUMENTS

| | | | | |
|---|---|---|---|---|
| 5,173,643 | A * | 12/1992 | Sullivan | H05B 41/2851 315/276 |
| 2002/0141207 | A1 * | 10/2002 | Van Den Braken | H05B 41/2856 363/34 |
| 2004/0075127 | A1 * | 4/2004 | Yamasaki | H01L 23/66 257/E27.113 |
| 2009/0327776 | A1 * | 12/2009 | Nguyen | G06F 1/26 323/283 |
| 2011/0210881 | A1 * | 9/2011 | Vilhonen | H03M 1/802 341/150 |
| 2012/0164960 | A1 * | 6/2012 | Levan | H02H 9/008 455/121 |
| 2013/0099759 | A1 | 4/2013 | Ura | |
| 2016/0103159 | A1 * | 4/2016 | Katsuki | G06F 1/28 327/540 |
| 2017/0149349 | A1 * | 5/2017 | Ando | H02M 3/33507 |
| 2017/0229246 | A1 * | 8/2017 | Nishiyama | H01G 4/30 |

(Continued)

FOREIGN PATENT DOCUMENTS

CN 103973175 A 8/2014
JP 2016-206906 A 12/2016

*Primary Examiner* — Danny Chan
(74) *Attorney, Agent, or Firm* — Maschoff Brennan

(57) ABSTRACT

A power supply circuit is configured to supply electric power to a microcontroller. A power supply line and a GND line connect the power supply circuit with a component of the microcontroller. A capacitor portion has a series structure and connects the power supply line with the GND line. The capacitor portion is configured to suppresses a fluctuation in the supplied electric power.

13 Claims, 7 Drawing Sheets

(56) References Cited

U.S. PATENT DOCUMENTS

| | | | |
|---|---|---|---|
| 2018/0151297 A1* | 5/2018 | Hattori | H01G 4/005 |
| 2019/0089244 A1* | 3/2019 | Koski | H02M 7/003 |
| 2019/0291778 A1 | 9/2019 | Nagashima et al. | |
| 2020/0161049 A1* | 5/2020 | Yializis | C08F 222/102 |
| 2020/0265999 A1* | 8/2020 | Kuruma | H01G 4/012 |
| 2020/0304112 A1* | 9/2020 | Zhang | H02H 1/0007 |
| 2021/0013814 A1* | 1/2021 | Fujita | H02M 7/003 |
| 2021/0098394 A1* | 4/2021 | Guo | H01L 27/01 |
| 2021/0119542 A1* | 4/2021 | Clavette | G06F 1/26 |
| 2021/0120673 A1* | 4/2021 | Matsumura | H05K 1/181 |
| 2022/0069866 A1* | 3/2022 | Kilian | H04B 5/0031 |
| 2022/0147079 A1* | 5/2022 | Kobayashi | G05F 1/46 |
| 2022/0295616 A1* | 9/2022 | Veldman | F21K 9/278 |
| 2022/0334846 A1* | 10/2022 | Doi | G06F 1/26 |

\* cited by examiner

FIG. 9

| COMPONENT | | SINGLE COMPONENT FAILURE RATE [FIT] @FIDES | USED NUMBER | DANGEROUS FAILURE | | DANGEROUS FAILURE RATE [FIT] | FUNCTIONAL DEFECT FAILURE RATE [FIT] | COST COEFFICIENT | COUNTER-MEASURE | DANGEROUS FAILURE RATE REDUCTION EFFECT [FIT] | INCREASE/DECREASE IN FUNCTIONAL DEFECT FAILURE RATE [FIT] | COUNTER-MEASURE COST COEFFICIENT | COUNTER-MEASURE PRIORITY |
|---|---|---|---|---|---|---|---|---|---|---|---|---|---|
| | | | | FAILURE MODE | INCIDENCE RATIO [%] | | | | | | | | |
| MICROCOMPUTER | | 10 | 1 | STOP | 60 | 6 | 63.8 | 300 | TWO SYSTEM | −59.8 | +63.8 | 308 | 3 |
| OSCILLATOR | | 16 | 1 | ALL | 100 | 16 | | 4 | | | | | |
| VCC POWER SOURCE | CAPACITOR (62) | 17 | 1 | SHORT | 90 | 15.3 | 59.8 | 1 | TWO SERIES | −15.3 | −15.3 | 1 | 1 |
| | CAPACITOR (61) | 1 | 4 | SHORT | 90 | 3.6 | | 1 | TWO SERIES | −3.6 | −3.6 | 1 | 2 |
| VCM POWER SOURCE | CAPACITOR (62) | 17 | 1 | SHORT | 90 | 15.3 | | 1 | TWO SERIES | −15.3 | −15.3 | 1 | 1 |
| | CAPACITOR (61) | 1 | 4 | SHORT | 90 | 3.6 | | 1 | TWO SERIES | −3.6 | −3.6 | 1 | 2 |

MICROCONTROLLER WITH CAPACITORS CONNECTED IN SERIES TO SUPPRESS POWER FLUCTUATION

CROSS REFERENCE TO RELATED APPLICATION

The present application is a continuation application of International Patent Application No. PCT/JP2020/046531 filed on Dec. 14, 2020, which designated the U. S. and claims the benefit of priority from Japanese Patent Application No. 2019-236619 filed on Dec. 26, 2019. The entire disclosures of all of the above applications are incorporated herein by reference.

TECHNICAL FIELD

The present disclosure relates to a control device.

BACKGROUND

In recent years, with the increase in required capacity, various systems related to operations of equipment have been electronically controlled. Furthermore, controls of systems have been considered for improvement in performance, and automation thereof have become complicated. Therefore, this fact may have required higher performance of control devices and an increase in components. On the other hand, in a case where a component of a control device fails, the system may be in a dangerous mode, and therefore, it would be necessary to steadily implement a functional safety design to reduce a risk thereof.

SUMMARY

According to an aspect of the present disclosure, a control device comprises a microcontroller; a power supply circuit configured to supply electric power to the microcontroller; a power supply line and a GND line connecting the power supply circuit with a component of the microcontroller; and a capacitor portion having a series structure and connecting the power supply line with the GND line. The capacitor portion is configured to suppresses a fluctuation in the supplied electric power.

BRIEF DESCRIPTION OF THE DRAWINGS

The above and other objects, features and advantages of the present disclosure will become more apparent from the following detailed description made with reference to the accompanying drawings. In the drawings:

The above and other objects, features and advantages of the present disclosure will become more apparent from the following detailed description made with reference to the accompanying drawings. In the drawings:

FIG. 9 is a view showing items computed by using a circuit design method for achieving both high functional safety, low defect rate, and low cost.

DETAILED DESCRIPTION

Figure 1:
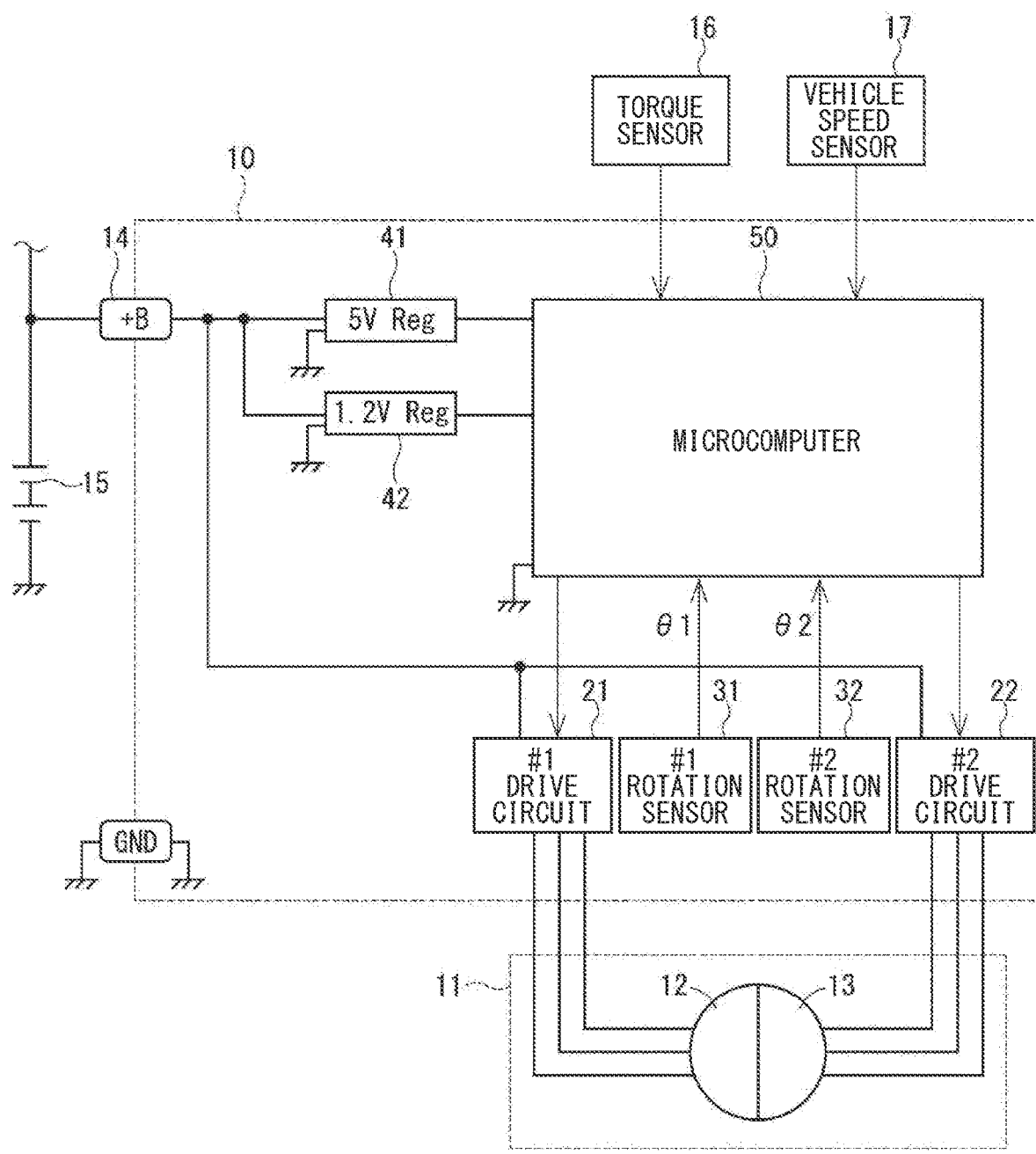
FIG. 1 is a configuration diagram showing a control device according to a first embodiment.

Hereinafter, examples of the present disclosure will be described.

According to an example of an electric power steering device in the present disclosure, various circuits including a microcomputer (hereinafter, "microcomputer" as appropriate) are completely systematized into two systems to adopt a redundant configuration.

However, in a case where various circuits of the control device are simply divided into two systems, the number of parts is doubled, and a failure rate of functional failure and the product cost may be significantly increased. The failure rate is proportional to a functional defect failure rate.

The inventor of the present disclosure has found, in order to address the conflict, that it is effective to take selective measures against failure modes, which lead to danger, by comprehensively determining based on an effect of reducing a failure rate of a failure mode that leads to danger (hereinafter referred to as a dangerous failure rate) and based on increase and decrease in a failure rate and a cost required for countermeasures, rather than simply systematizing the various circuits of the control device into two systems.

According to an example of the present disclosure, a control device comprises: a microcontroller; a power supply circuit configured to supply electric power to the microcontroller; a power supply line and a GND line connecting the power supply circuit with a component of the microcontroller; and a capacitor portion connecting the power supply line with the GND line and configured to suppress a fluctuation in the supplied electric power. The capacitor portion has a series structure.

In this way, with the capacitor portion in a series structure, an effect of a short circuit failure of the capacitor becomes a capacitance reduction level, and the effect on the system including the control device becomes small. Thus, this configuration may reduce its dangerous failure rate. In addition, rather than by systematizing the microcomputer and its peripheral circuits into two systems, for example, by making the capacitor portions in the series structure by using multiple capacitors, the failure rate may be reduced, and a cost performance for reducing the dangerous failure rate may become significantly high. Therefore, according to the control device, high functional safety, low defect rate, and low cost may be achieved at the same time.

In the present specification, "a power supply line and a GND line connecting the power supply circuit with a component of the microcontroller" may encompass a case in which the lines are an external part of the microcomputer and a case in which the limes are both the external part and an internal part of the microcomputer. That is, the power supply line and the GND line may encompass not only a part that connects the terminal of the power supply circuit with the terminal of the microcomputer, but also a part that connects the terminal of the power supply circuit with a component, which is inside the microcomputer (that is, an electronic component), in the microcomputer.

Further, in the description, "the capacitor portion has a series structure" encompasses a form, in which multiple capacitors are connected in series, and a form, in which three or more internal electrodes are arranged in series inside a singular capacitor.

Hereinafter, a plurality of embodiments of the control device will be described with reference to the drawings. In the embodiments, components which are substantially similar to each other are denoted by the same reference numerals and redundant description thereof is omitted.

First Embodiment

As shown in FIG. 1, an ECU 10 as a control device according to a first embodiment controls a motor 11. The ECU 10 is applied together with the motor 11 to, for example, an electric power steering device for assisting a vehicle steering operation.

The motor 11 is a three-phase brushless motor in this embodiment, and includes two winding sets 12 and 13. The motor 11 is rotated by the electric power from a battery power source 14. The battery power supply 14 is electrically connected to the high potential side of a battery 15 as an external power supply mounted on the vehicle. The battery power supply 14 is supplied with electric power at an external power supply voltage, which is a predetermined voltage, from the battery 15. In this embodiment, the external power supply voltage is about 12V in a normal condition.

The ECU 10 includes drive circuits 21, 22, rotation angle sensor circuits 31, 32, power supply circuits 41, 42, a microcomputer 50, and the like.

A first drive circuit 21 is a three-phase inverter, and the power from the battery power supply 14 is converted and supplied to the three windings of the first winding set 12 by switching operation of six switching elements (not shown). A second drive circuit 22 has the same configuration as the first drive circuit 21, and supplies electric power to the three windings of the second winding set 13. The drive circuits 21 and 22 are systematized into two systems and have a redundant configuration.

A first rotation angle sensor circuit 31 detects a rotation angle 81 of the motor 11 and outputs a detection signal to the microcomputer 50. A second rotation angle sensor circuit 32 detects a rotation angle 82 of the motor 11 and outputs a detection signal to the microcomputer 50. The rotation angle sensor circuits 31 and 32 are systematized into two systems and have a redundant configuration. Detection signals from a torque sensor 16 and a vehicle speed sensor 17 and the like are also input to the microcomputer 50.

One end of the first power supply circuit 41 (hereinafter referred to as a VCS power supply circuit 41) is connected to the battery power supply 14. The VCS power supply circuit 41 outputs a predetermined first voltage lower than the external power supply voltage (about 12V) from the other end and applies the predetermined first voltage to the microcomputer 50. In the present embodiment, in the normal state, the VCS power supply circuit 41 stably outputs, for example, about 5 V as the first voltage.

One end of a second power supply circuit 42 (hereinafter, VCM power supply circuit 42) is connected to the battery power supply 14. The VCM power supply circuit 42 outputs a predetermined second voltage lower than the first voltage from the other end and applies the second voltage to the microcomputer 50. In the present embodiment, in the normal state, the VCM power supply circuit 42 stably outputs, for example, about 1.2 V as the second voltage.

The microcomputer 50 is a semiconductor package including a CPU, ROM, RAM, I/O, and the like. The microcomputer 50 performs a computation according to a program stored in the ROM based on signals from the rotation angle sensor circuits 31, 32, the torque sensor 16, the vehicle speed sensor 17, and the like. The microcomputer 50 generates a control signal and outputs the control signal to the drive circuits 21 and 22, and controls the motor 11.

(Microcomputer Peripheral Configuration)

Next, a peripheral configuration of the microcomputer 50 will be described. Before the description, a reference form and its subject will be described.

In recent years, speed of microcomputers has been increasing along with an increase in functionality. On the other hand, due to a miniaturization of semiconductor processes, wirings inside a microcomputer chip have become thinner, and the number of power supply terminals and GND terminals tends to increase for one microcomputer. Thus, the number of stabilizing capacitors that suppress fluctuations in the supply power tends to increase. In the case of a system such as an electric power steering device, outage of a microcomputer and a short-mode failure of the stabilizing capacitor may become a dangerous mode of an ASIL-C grade. ASIL represents an Automotive Safety Integrity Level.

Therefore, it is necessary to surely implement a functional safety design to reduce the risk. In this respect, as disclosed in WO2018/042657A1, it is conceivable to completely systematize various circuits including a microcomputer into two systems and adopt a redundant configuration. However, in a case where the various circuits of the control device are simply divided into two systems, the number of components is doubled, and a failure rate of a functional failure and its product cost would be significantly increased. Even though, in a case where the ASIL-D grade is required for functional outage in such as an autonomous unmanned operation, there is no choice but to select the two systems.

Therefore, in this embodiment, a design is implemented by using a circuit design method to achieve both high functional safety, low failure rate, and low cost. Specifically, the design is implemented according to the following (procedure 1) to (procedure 3).

Figure 8:
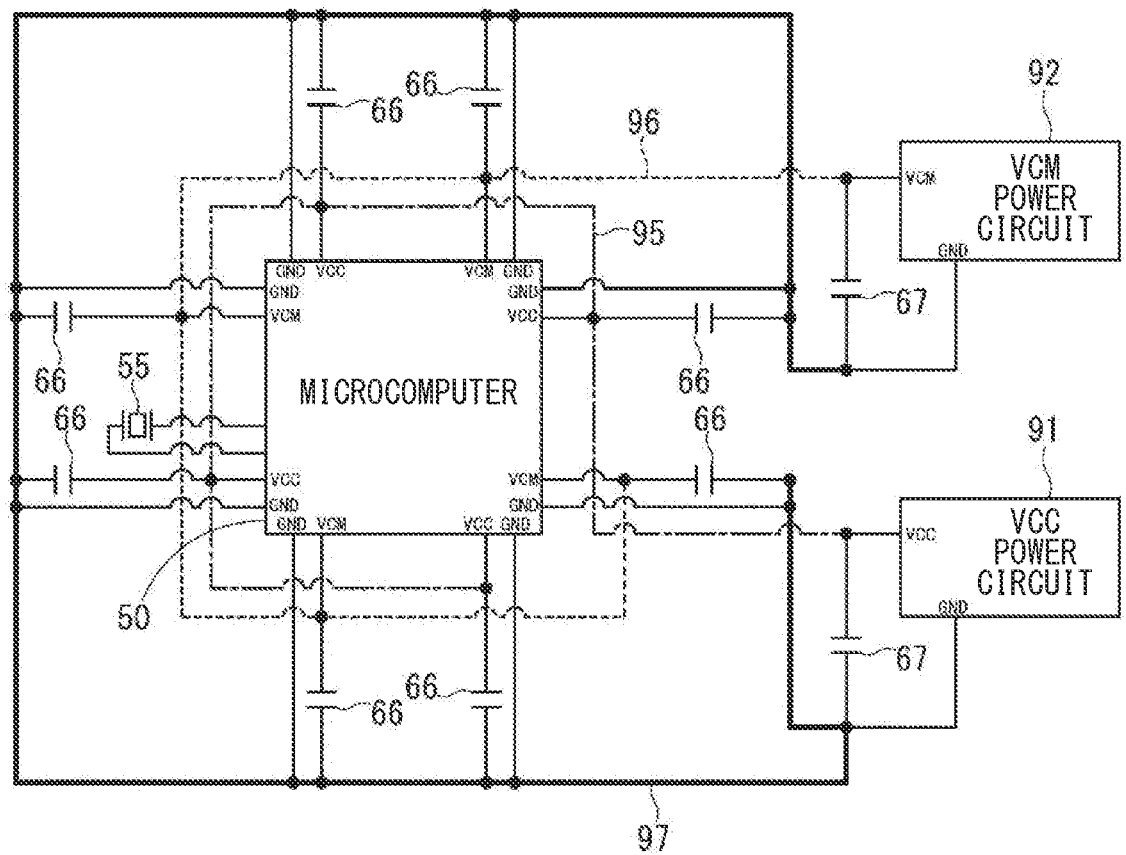
FIG. 8 is a diagram showing a microcomputer of a control device according to an example embodiment and its peripheral configuration.

(Procedure 1) FMEDA (Failure Mode, Effect and Diagnostic Analysis) is implemented on a configuration before performing the redundancy, that is, in the reference mode shown in FIG. 8. In addition, components leading to danger due to failure, a failure mode thereof, and a failure rate of the failure mode (hereinafter referred to as a dangerous failure rate) are computed.

(Procedure 2) In the order of the dangerous failure rate, a countermeasure method, an effect of reducing the dangerous failure rate by the countermeasure, increase a decrease in the functional failure rate, a required cost, and a required size (for example, a mounting area) are analyzed.

(Procedure 3) Design is implemented by comprehensively performing determination based on the factor of the above (procedure 2), such that three goals including a Target Failure Rate (PMHF: Probabilistic Metric for random Hardware Failure), a Single-Point Fault Metric (SPFM), and a Latent-Fault Metric (LFM) are satisfied.

In a reference embodiment shown in FIG. 8, the microcomputer 50 has eight power supply terminals (that is, four VCS terminals and four VCM terminals) and eight GND terminals. The VCS terminals are connected to the output terminal of a VCS power supply circuit 91 via a power supply line 95 which is a round wiring. The VCM terminals are connected to the output terminal of a VCM power supply circuit 92 via a power supply line 96 which is a round wiring. The GND terminals are connected to the GND terminals of the power supply circuits 91 and 92 via a GND line 97 which is a round wiring. Capacitor portions 66 for power stabilizing are provided near the power supply terminals of the microcomputer 50 so as to connect the power supply lines 95 and 96 with the GND line 97. Capacitor portions 67 for power stabilization are provided near the power supply circuits 91 and 92 so as to connect the power supply lines 95 and 96 with the GND line 97. An oscillator 55 is connected to the microcomputer 50.

FIG. 9 shows a result of computation of a "component leading to danger", the "failure mode", and the "dangerous failure rate" of the above (procedure 1) in the above reference embodiment. The dangerous failure rate is expressed by a product of an incidence ratio of failure mode, a failure rate of component, and a used number of component.

A capacitor 61 is a generally used monolithic ceramic capacitor, and most of the failure mode caused due to the structural thereof is a short mode. For example, in the failure database of IEC/TR62380, the short mode is 90%, and an open mode is 10%. Therefore, the dangerous failure rate of the capacitor 61 is relatively high. Furthermore, the used number of the capacitors 61 is large. Therefore, a total dangerous failure rate due to the total capacitors 61 occupies about 60% of the entire circuit.

On the other hand, the dangerous failure rate of the microcomputer 50 is about 10% of the entire circuit and is relatively small. In addition, it is conceivable to employ two systems as a countermeasure against shutdown of the microcomputer. However, as mentioned above, all the peripheral circuits of the microcomputer 50 are also required. Therefore, there is a trade-off that the failure rate and the product cost would increase significantly.

Figure 2:
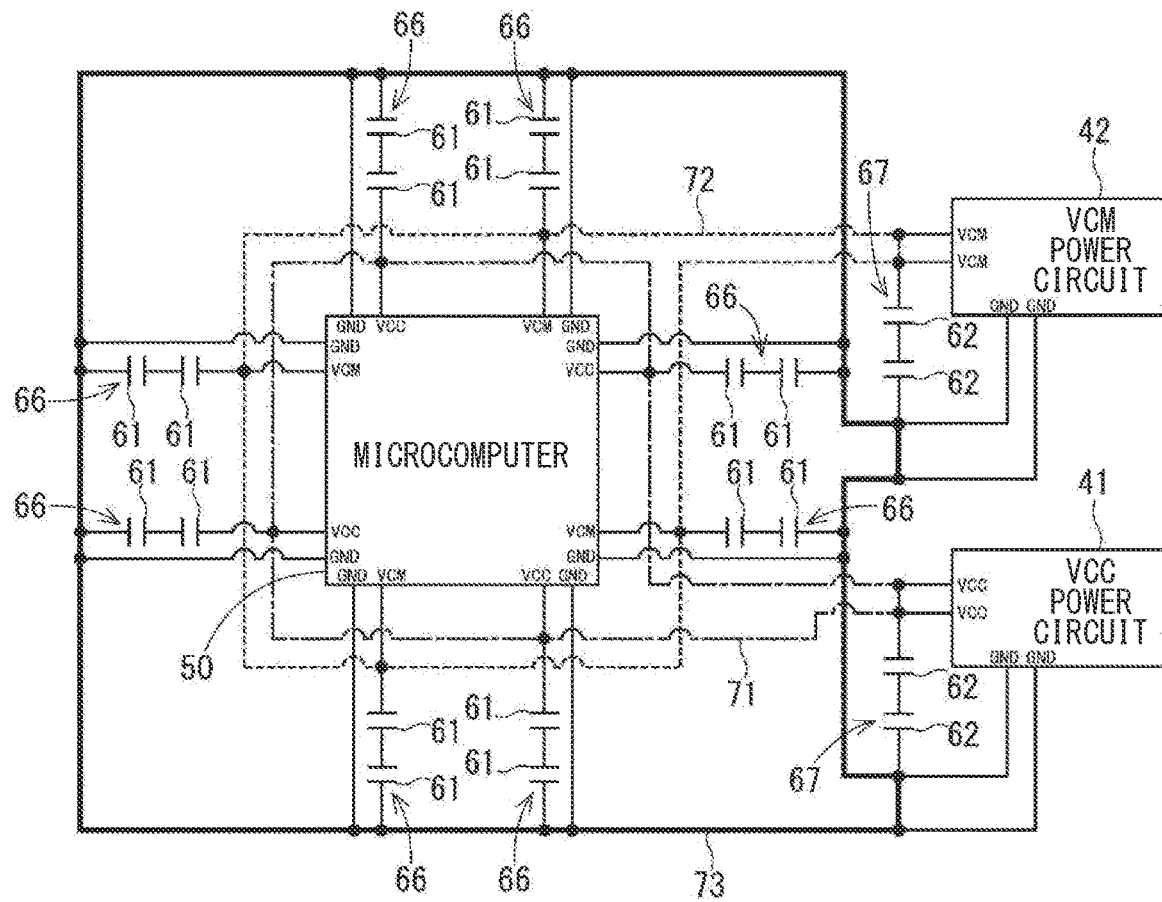
FIG. 2 is a diagram showing a microcomputer of FIG. 1 and its peripheral configuration.

Therefore, it is determined that it is effective to selectively take a measure against the failure mode that leads to danger, and that it would be optimal to take only the measure to employ a configuration in which the capacitors 61 are in series. As shown in FIG. 2, the peripheral configuration of the microcomputer 50 is designed.

As shown in FIG. 2, capacitor portions 66 are provided near the microcomputer 50 so as to connect power supply lines 71 and 72 with a GND line 73. Further, capacitor portions 67 are provided near the power supply circuits 41 and 42 so as to connect the power supply lines 71 and 72 with the GND line 73. The capacitor portions 66 and 67 are configured to suppress a fluctuation in the supplied power and have a series structure. In the present embodiment, the capacitor portion 66 includes a plurality of capacitors 61 connected in series, and the capacitor portion 67 includes a plurality of capacitors 62 connected in series. In FIG. 2, the oscillator is not shown.

The power supply lines 71 and 72 and the GND line 73 connect the corresponding power supply circuits 41 and 42 with components of the microcomputer 50 in a ring shape. The power supply lines 71 and 72 and the GND line 73 are ring-shaped wirings. In the present embodiment, the power supply lines 71 and 72 and the GND line 73 refer to an external portion of the microcomputer 50, that is, a portion connecting the terminals of the power supply circuits 41 and 42 with the terminals of the microcomputer 50.

The output terminals and GND terminals of the power supply circuits 41 and 42 includes two terminal elements. The power supply lines 71 and 72 and the GND line 73 are ring-shaped wirings including the output terminals or GND terminals of the power supply circuits 41 and 42 which include two terminal elements. That is, the power supply line 71 connects the output terminal of the VCC power supply circuit 41 which are made into two terminal elements with the VCC terminals of the microcomputer 50 in a ring shape. The power supply line 72 connects the output terminal of the VCM power supply circuit 42 which are made into two terminal elements and the VCM terminals of the microcomputer 50 in a ring shape. The GND line 73 connects the GND terminals of the power supply circuits 41 and 42 which include two terminal elements and the GND terminals of the microcomputer 50 in a ring shape.

Figure 3:
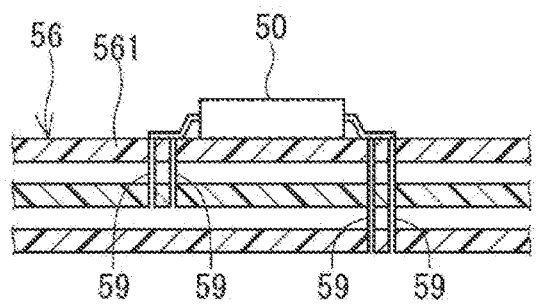
FIG. 3 is a cross-sectional view schematically showing a circuit board on which the microcomputer of FIG. 1 is mounted.

As shown in FIG. 3, electronic components such as the microcomputer 50 are mounted on a circuit board 56. The circuit board 56 is a multilayered circuit board and has a plurality of through-holes 59 connecting different layers with each other. In FIG. 3, the microcomputer 50 is mounted on a layer 561 having a specific surface of the circuit board 56. The power supply line and the GND line have a plurality of portions of the through-holes 59 arranged in parallel.

Effects

As described above, in the first embodiment, the capacitor portions 66 and 67 have the series structure. With this structure, an influence of the short-circuit failure of the capacitors 61 and 62 becomes a capacitance reduction level, and an influence on the system including the ECU 10 becomes small. Thus, this configuration may reduce its dangerous failure rate. In addition, rather than by systematizing the microcomputer and its peripheral circuits into two systems, by making the capacitor portions 66, 67 in the series structure by using multiple capacitors 61, 62, the failure rate may be reduced, and a cost performance for reducing the dangerous failure rate may become significantly high. Therefore, according to the ECU 10, high functional safety, low defect rate, and low cost may be achieved at the same time.

Further, in the first embodiment, the power supply lines 71 and 72 and the GND line 73 connect the power supply circuits 41 and 42 with the components of the microcomputer 50 in a ring shape. As a result, a system influence due to a disconnection failure of the power supply lines 71 and 72 and the GND line 73 can be suppressed.

Further, in the first embodiment, the power supply lines 71 and 72 and the GND line 73 have a plurality of portions of the through-holes 59 arranged in parallel. As a result, a system influence due to a disconnection failure of the power supply lines 71 and 72 and the GND line 73 can be suppressed.

Further, in the first embodiment, the ECU 10 further includes the two systems of the drive circuits 21 and 22 and the two systems of the rotation angle sensor circuits 31 and 32 connected to the microcomputer 50. In the control device provided with the two-system circuit, the capacitor portions 66 and 67 have the series structure without systematizing the microcomputer 50 and its peripheral circuits into two systems. This configuration enables to avoid further increase in the defect rates and product costs.

Further, in the first embodiment, the output terminals and GND terminals of the power supply circuits 41 and 42 are made into two terminal elements. In this way, a system influence due to the disconnection failure can be suppressed.

Second Embodiment

Figure 4:
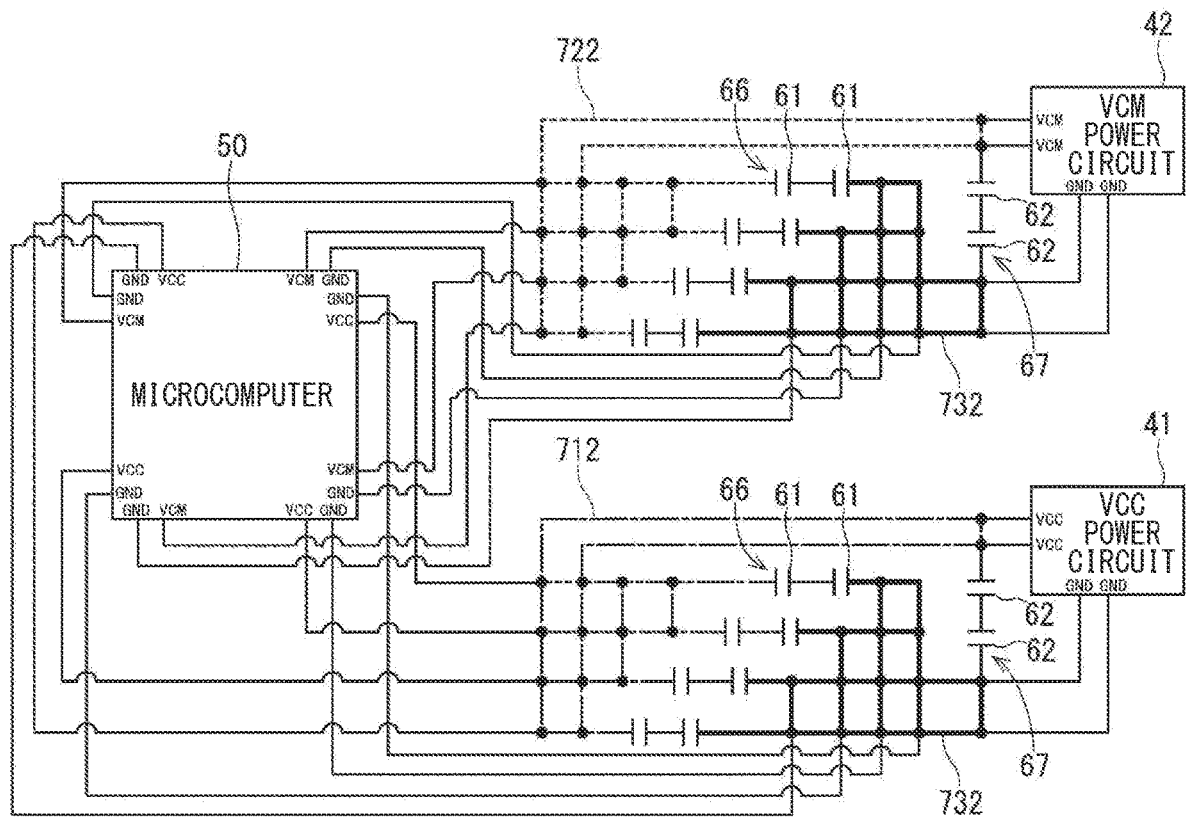
FIG. 4 is a diagram showing a microcomputer of a control device according to a second embodiment and its peripheral configuration.

In the second embodiment, as shown in FIG. 4, power supply lines 712 and 722 and GND lines 732 connect the power supply circuits 41 and 42 with the microcomputer 50 in a net form. In this way, the lines may form a net-like wiring. Except for the above, the second embodiment has the same configuration as the first embodiment, and has the same effects as the first embodiment.

Third Embodiment

Figure 5:
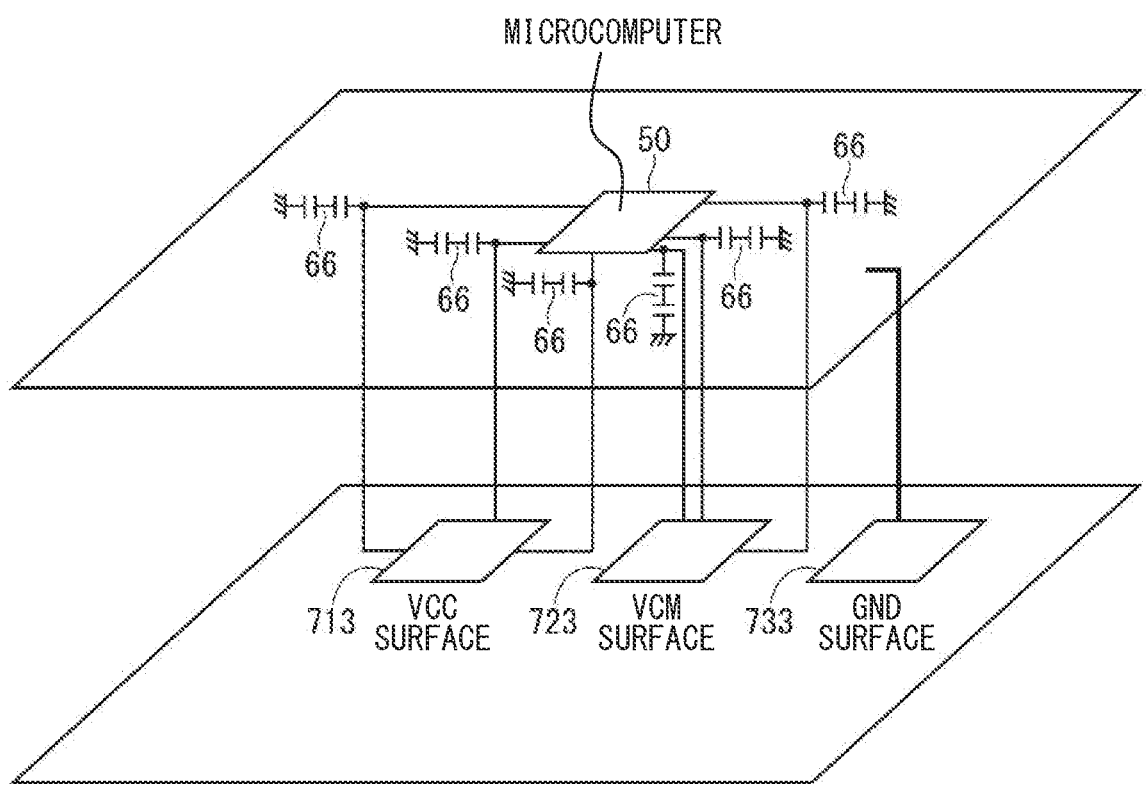
FIG. 5 is a diagram showing a microcomputer of a control device according to a third embodiment and its peripheral configuration.

In the third embodiment, as shown in FIG. 5, power supply lines 713 and 723 and a GND line 733 connect the power supply circuit (not shown) with the microcomputer 50 in a plane shape (that is, in a surface shape). In this way, the lines may form a plain-like wiring. Except for the above, the third embodiment has the same configuration as the first embodiment, and has the same effects as the first embodiment.

Fourth Embodiment

Figure 6:
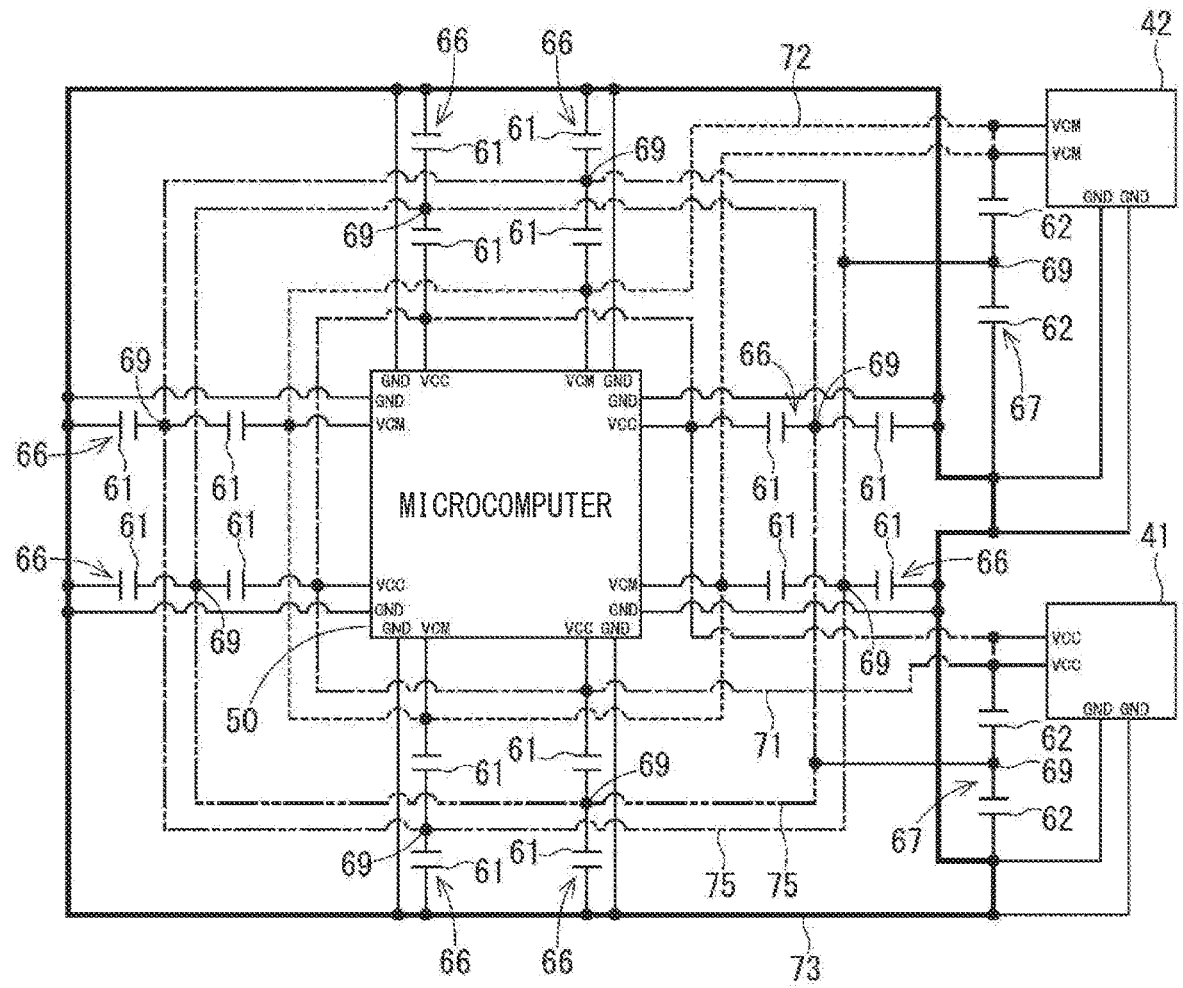
FIG. 6 is a diagram showing a microcomputer of a control device according to a fourth embodiment and its peripheral configuration.

In the fourth embodiment, as shown in FIG. 6, series connection intermediate points 69 of the plurality of capacitor portions 66 and 67 are connected to each other by intermediate point connection lines 75. In this way, when the capacitors 61 and 62 fail, decrease in the total capacitance is suppressed or increased. Therefore, the capacity of each capacitor can be reduced, and a product cost can be reduced. Except for the above, the fourth embodiment has the same configuration as the first embodiment, and has the same effects as the first embodiment.

Fifth Embodiment

Figure 7:
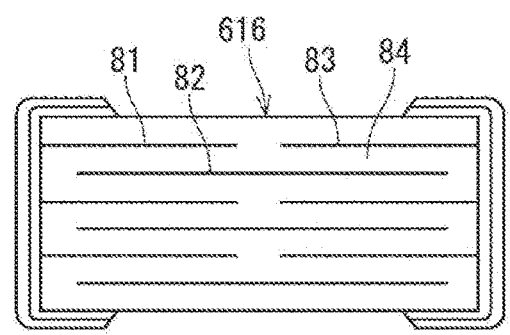
FIG. 7 is a diagram showing a capacitor portion of a control device according to a fifth embodiment.

In the fifth embodiment, as shown in FIG. 7, a capacitor portion 616 includes a singular multilayered ceramic capacitor in which three internal electrodes 81, 82, and 83 are arranged in series with a dielectric layer 84 sandwiched therebetween. In this way, even when a disconnection of the internal electrodes occurs or even when a short circuit between the internal electrodes occurs, an extreme failure mode does not occur and the influence on the system is reduced. In addition, the number of components is reduced, and the mounting area is reduced, compared with a structure in which two or more capacitors are directly connected. Except for the above, the fifth embodiment has the same configuration as the first embodiment, and has the same effects as the first embodiment.

Other Embodiments

In another embodiment, the capacitor portion may be formed with three or more capacitors connected with each other in series. Further, the capacitor portion may be formed with a multilayer ceramic capacitor and another type of capacitor which are mixed with each other. Further, the series structure of one of the capacitor portions may be different from the series structure of another of the capacitor portions.

In another embodiment, the plurality of electronic components constituting the ECU may be all mounted on the same circuit board, or some of them may be mounted on another circuit board.

In another embodiment, the ECU may include, as a specific circuit of two or more system connected to the microcomputer, a circuit such as a communication circuit in addition to or in place of the drive circuit and the sensor circuit.

In another embodiment, the winding of the motor is not limited to the three phase winding, and may be configured to have various numbers of phases. The control device is not limited to be for the electric power steering device, and may be, for example, a device for driving other parts of the vehicle. The control device is not limited to be for the vehicle and may control another general equipment.

The present disclosure is not limited to the embodiments described above, and various modifications are possible within the scope of the present disclosure without departing from the spirit of the invention.

The present disclosure has been described in accordance with embodiments. However, the present disclosure is not limited to this embodiment and structure. This disclosure also encompasses various modifications and variations within the scope of equivalents. Various combinations and modes, and other combinations and modes including only one element, more elements, or less elements therein are also within the scope and spirit of the present disclosure.

What is claimed is:

1. A control device comprising:
  a microcontroller;
  an external power supply;
  a power supply circuit configured to supply electric power at a voltage, which is lower than a voltage of the external power supply, to the microcontroller;
  a power supply line and a GND line connecting the power supply circuit with a component of the microcontroller; and
  a capacitor portion having a series structure and connecting the power supply line with the GND line, the capacitor portion configured to suppresses a fluctuation in the supplied electric power; and
  a system connected to the microcontroller and configured to drive a motor, the system includes
    i) a drive device including a first drive circuit and a second drive circuit, the first drive circuit and the second drive circuit each having the same configuration and systematized into two respective systems with each system having a redundant configuration to drive the motor, and
    ii) a sensor device including a first sensor circuit and a second sensor circuit, the first sensor circuit and the second sensor circuit each having the same configuration and systematized into two respective systems with each system having a redundant configuration to detect rotation of the motor,
  the capacitor portion having the series structure includes
    a structure in which a plurality of capacitor elements, which are separate single bodies, are connected in series, or
    a structure in which a capacitor element, which is a single body, includes three or more internal electrodes that are arranged in series with a dielectric layer sandwiched therebetween,
  wherein
  the power supply circuit includes a GND terminal and a first power supply terminal, the GND terminal is at a ground potential, the first power supply terminal is configured to continuously apply a first voltage that is at a constant potential with respect to the ground potential, the capacitor portion is applied with the first voltage of the power supply circuit, and the microcontroller is configured to be supplied with the electric power from the power supply circuit and to be continuously applied with the first voltage at the constant potential, when one of the capacitor elements causes a short-mode failure or when two of the internal electrodes causes a short-mode failure.

2. The control device according to claim 1, wherein the power supply line connects the power supply circuit with the component of the microcontroller in, a ring shape.

3. The control device according to claim 1, wherein at least one of the power supply line or the GND line has a plurality of through-hole portions arranged in parallel.

4. The control device according to claim 1, further comprising:
a specific circuit including
two or more systems of the first drive circuit and the second drive circuit connected to the microcontroller, and
two or more systems of the first sensor circuit and the second sensor circuit connected to the microcontroller.

5. The control device according to claim 1, wherein at least one of an output terminal, an input terminal, or the GND terminal of the power supply circuit includes two terminal elements.

6. The control device according to claim 1, wherein the capacitor portion is one of a plurality of capacitor portions, wherein
the control device further comprising:
an intermediate point connection line connecting series connection intermediate points of the plurality of the capacitor portions with each other.

7. The control device according to claim 1, wherein the capacitor portion includes a capacitor in which three or more internal electrodes are arranged in series.

8. The control device according to claim 6, wherein each of the capacitor portions includes two capacitors, which are connected in series with each other via corresponding one of the series connection intermediate points.

9. The control device according to claim 1, wherein the plurality of capacitor elements are monolithic ceramic capacitors.

10. The control device according to claim 1, wherein the microcontroller is configured to be continuously supplied with the electric power from the power supply circuit, and the capacitor portion is configured to continuously suppress a fluctuation in the supplied power, when one of the capacitor elements causes the short-mode failure or when two of the internal electrodes causes the short-mode failure.

11. The control device according to claim 1, wherein the power supply circuit is configured to supply the electric power to the microcontroller by applying the first voltage, which is a DC voltage, to the microcontroller and by supplying a DC current to the microcontroller, the capacitor portion connects the power supply line, which is to supply the DC current to the microcontroller, with the GND line to suppress the fluctuation in the supplied power, and the microcontroller is configured to be continuously supplied with the electric power by the DC current from the power supply circuit, and the capacitor portion is configured to continuously suppress a fluctuation in the supplied power, when one of the capacitor elements causes the short-mode failure or when two of the internal electrodes causes the short-mode failure.

12. The control device according to claim 1, wherein the capacitor portion is configured such that a load voltage increases in a capacitor element, which does not cause the short-mode failure among the capacitor elements, when one of the capacitor elements causes the short-mode failure, or the capacitor portion is configured such that a load voltage increases in an internal electrode, which does not cause the short-mode failure among the internal electrodes, when two of the internal electrodes causes the short-mode failure.

13. The control device according to claim 1, wherein the power supply line and GND line are each disposed in a ring around the microcontroller and the microcontroller is disposed at the center of the ring.

* * * * *